United States Patent

[11] 3,621,976

[72] Inventor Jesse C. Moore
 Fort Recovery, Ohio
[21] Appl. No. 882,032
[22] Filed Dec. 4, 1969
 Division of Ser. No. 519,179, Jan. 6, 1966,
 Pat. No. 3,483,600.
[45] Patented Nov. 23, 1971
[73] Assignee Norman H. Kuhlman
 St. Marys, Ohio
 a part interest

[54] APPARATUS FOR TRANSFER OF FLOWABLE MATERIAL FROM A HOPPER
 1 Claim, 7 Drawing Figs.
[52] U.S. Cl. .................................................. 198/57, 198/159, 25/36
[51] Int. Cl. .................................................. B65g 47/18
[50] Field of Search .................................................. 198/43–44, 46, 54, 56, 57, 65–69, 174, 168, 169, 159; 25/30, 40, 100, 36

[56] References Cited
 UNITED STATES PATENTS
 411,439 9/1889 Hart .................................................. 198/67
 2,156,878 5/1939 De Los Sinden .................................................. 198/168
 FOREIGN PATENTS
 531,237 4/1955 Italy .................................................. 198/44

Primary Examiner—Richard E. Aegerter
Attorney—William R. Jacox

ABSTRACT: Apparatus for transferring or feeding flowable material to a desired location from a container such as a hopper. A pair of shelf members are disposed below the hopper. The shelves are substantially horizontal and arranged one above the other. A pair of spaced-apart chains or other continuous flexible members have crossmembers therebetween. The crossmembers move over the upper shelf in a direction away from the desired location, and then move over the lower shelf in a direction toward the desired location. The upper shelf is shorter in length than the lower shelf so that material moved upon the upper shelf falls therefrom to the lower shelf and is moved by the crossmembers on the lower shelf to the desired location.

INVENTOR.
JESSE C. MOORE
BY William R Jacox
ATTORNEY

INVENTOR.
JESSE C. MOORE
BY William R Jacox
ATTORNEY

APPARATUS FOR TRANSFER OF FLOWABLE MATERIAL FROM A HOPPER

RELATED APPLICATION

This application is a division of copending application Ser. No. 519,179, filed Jan. 6, 1966 now U.S. Pat. No. 3,483,600.

BACKGROUND OF THE INVENTION

In numerous types of industries it is necessary or desirable to move material from a hopper or the like to a desired location. The apparatus of this invention is capable of moving material from a hopper to a desired location, to fill a container or the like at the location, and to automatically remove any excess of material.

The apparatus of this invention is particularly adapted for feeding molding material such as concrete or the like to a device for molding cylindrical members, such as tile or the like. However, the invention is not so limited due to the fact that the apparatus of this invention may be employed for feeding various types of materials for any one of various uses or purposes.

DESCRIPTION OF THE PREFERRED EMBODIMENT

The apparatus of this invention is shown in use with means for producing cylindrical hollow bodies, such as tile or the like. However, the apparatus of this invention may be used with or for other types of mechanism or devices or apparatus.

Figure 1:
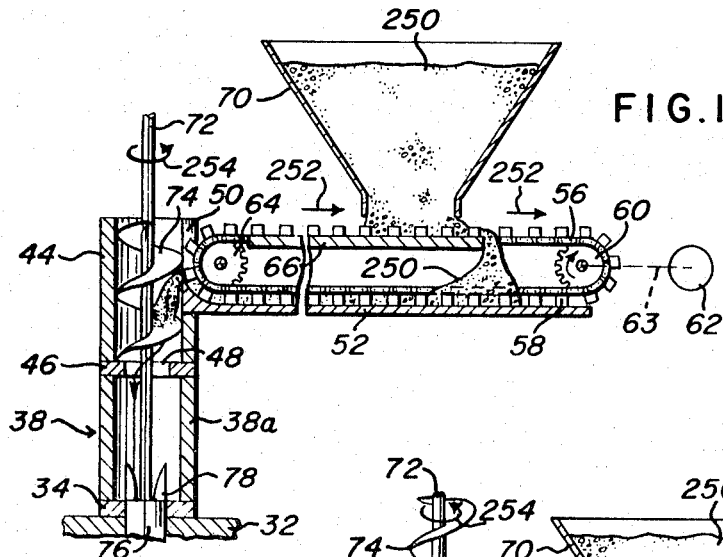
FIG. 1 is a sectional view, with parts broken away, showing material transfer means of this invention in association with means for forming a cylindrical member.
Figure 2:
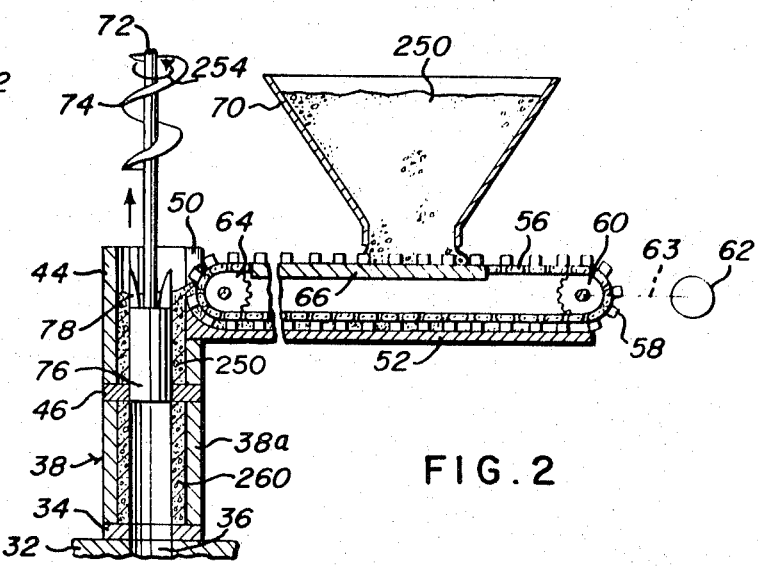
FIG. 2 is a sectional view, similar to FIG. 1, but showing elements of the apparatus in another position of operation.
Figure 3:
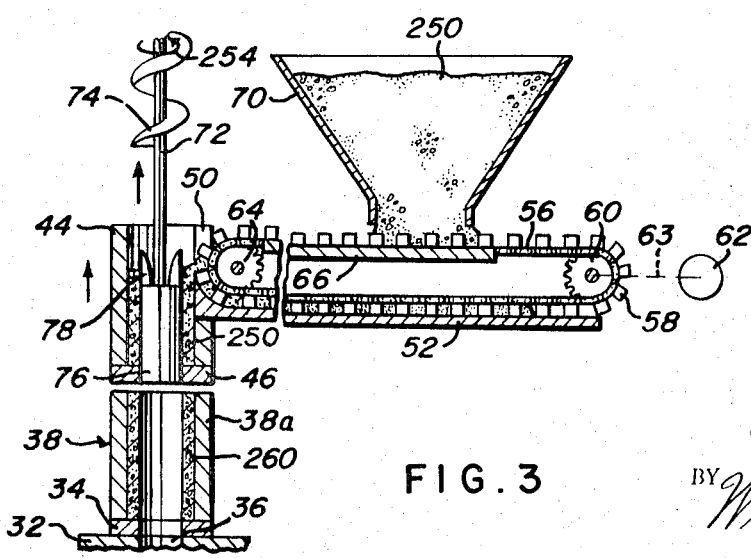
FIG. 3 is a sectional view, similar to FIGS. 1 and 2, but showing elements of the apparatus in another position of operation.
Figure 4:
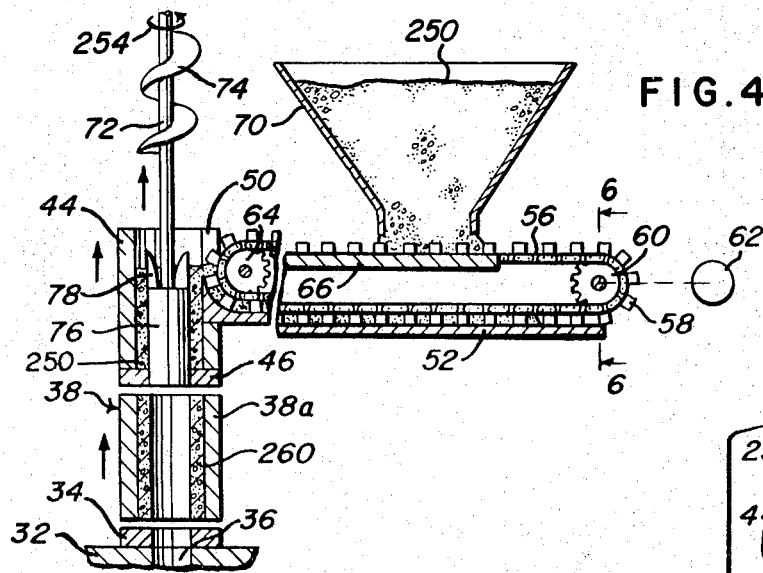
FIG. 4 is a sectional view, similar to FIGS. 1, 2, and 3 but showing elements of the apparatus in another position of operation.
Figure 5:
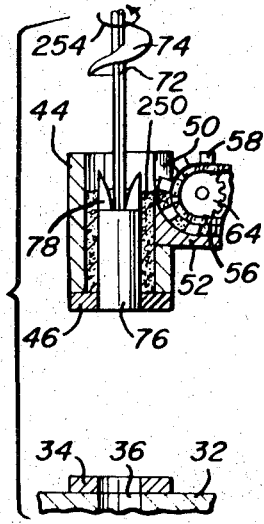
FIG. 5 is a sectional view of a portion of the apparatus of FIGS. 1, 2, 3, and 4 showing elements thereof in another position of operation.
Figure 6:
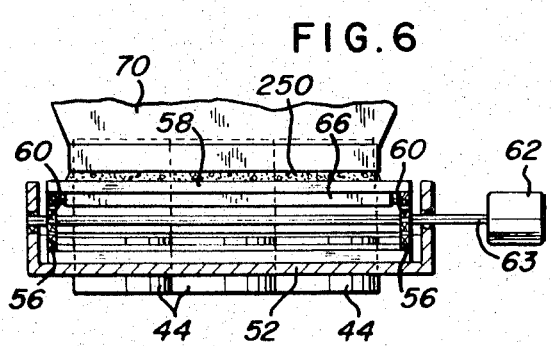
FIG. 6 is a sectional view taken substantially on line 6—6 of FIG. 4.

A base 32 having a recess 36 is shown in supporting relationship to a bottom wall 34. Movably supported upon the bottom wall 34 are a plurality of mold cavity members 38. These are in engagement with the bottom wall 34 and coaxial with the recess 36, as shown in FIGS. 1, 2, and 3. Movably disposed above the mold cavity members 38 are a plurality of filler tubes 44, there being one filler tube 44 for each of the mold cavity members 38. Each filler tube 44 has a bottom wall 46 which is provided with a hole 48 therethrough, as shown in FIG. 1. Each filler tube 44 has a longitudinally extending opening 50 in the side thereof. Partially disposed within the opening 50 is a feeder floor 52. A portion of the floor 52 may rest upon the filler tube 44 and be movable therewith, as the floor 52 pivots about the axis of a sprocket wheel 60.

An endless conveyor chain 56 having a plurality of transverse spaced-apart crossmembers 58 is disposed above the feeder floor 52. The drive sprocket wheel 60 engages the conveyor chain 56 and is rotated by any suitable drive motor 62 which is operably joined thereto through a shaft 63 or the like. An idler sprocket wheel 64 is also shown in engagement with the conveyor chain 56. The upper part of the chain 56 slidably moves over a shelf 66 which is disposed a slight distance below a hopper 70.

Extending into each of the filler tubes 44 is a shaft 72 having several convolutions of a screw blade 74 carried thereby. At the lower end of each shaft 72 is a plunger or packer 76 provided with ears 78 at the upper portion thereof. The shafts 72 are rotatably carried by any suitable means, not shown.

OPERATION

Suitable material 250 for producing hollow cylindrical conduit members is supplied to the hopper 70, as shown in FIGS. 1, 2, 3, 4, and 7. The material 250 may comprise concrete or the like or any other suitable flowable material. FIG. 1 shows the position of the members of the apparatus at the beginning of a cycle of producing a conduit member. Each plunger or packer 76 is positioned within the recess 36 as the packer 76 is in its lowermost position. The motor 62 is operating and rotates the drive sprocket wheel 60. Thus, the endless conveyor chain 56 and the crossmembers 58 are moving in the direction illustrated by arrows 252 in FIG. 1. Thus, the crossmembers 58 move the material 250 from the bottom of the hopper 70 and along the shelf 66. The material 250 falls from the shelf 66 and between the crossmembers 58. The material 250 falls upon the feeder floor 52 and is moved by the crossmembers 58 of the chains 56 toward the filler tubes 44. The material 250 falls from the feeder floor 52 into the filler tubes 44.

While the material 250 is being introduced into the mold cavity members 38a, the shafts 72 are being rotated. The shafts 72 are rotated in the direction illustrated by an arrow 254 in FIG. 1. The rotating screw blade 74 carried by each shaft 72 urges the material 250 from its respective filler tube 44 into the mold cavity member 38 which is directly therebelow. Thus, the screw blades 74 force the material 250 into the mold cavity members 38. After the material 250 begins to fall into the mold cavity members 38, the shafts 72 are lifted slowly, moving the packers 76 from the bottom of the mold cavity members 38a to the top thereof, as illustrated in FIG. 2. Therefore, the material 250 within the mold cavity members 38 is forced toward the sides of the mold cavity members 38 by the plungers 76 and by the ears 78 thereof. Thus, the material 250 within each mold cavity member 38a is formed into a hollow cylindrical conduit member 260 as shown in FIG. 2.

Figure 7:
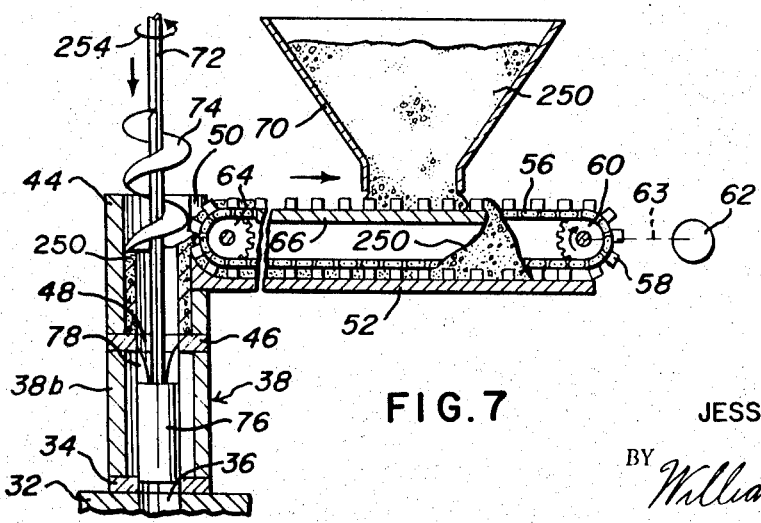
FIG. 7 is a sectional view, similar to FIGS. 1, 2, 3, and 4, but showing elements of the apparatus in another position of operation.

The motor 62 is operated during a period of time which is necessary to transfer sufficient material 250 from the hopper 70 to the filler tubes 44 for the formation of a cylindrical member 260 within each mold cavity member 38. However, in order to assure that a sufficient amount of material 250 is available to form a cylindrical member 260 within each mold cavity member 38, an excess of the material 250 is fed into the filler tubes 44, as illustrated in FIG. 2. Thus, after a tubular member 260 is formed within each mold cavity member 38 a quantity of material 250 remains within each of the filler tubes 44. This excess material 250 appears in the form of a tubular body of material 250, encompassing the packer 76 within each filler tube 44, as shown in FIG. 2. The amount of the excess material 250 remaining in the filler tubes 44 after formation of tubular members 260 within the mold cavity members 38 varies. The amount of excess material 250 remaining in the filler tubes 44 varies with certain conditions in the material 250 and with other conditions of operation of the apparatus. When the material 250 within the filler tubes 44 reaches a certain height, movement of the crossmembers 58 in a direction toward the hopper 70 carries therewith a portion of the excess material 250, as illustrated in FIG. 7.

Thus, the material feed apparatus shown in FIGS. 1, 2, 3, 4, and 7 always transfers sufficient material 250 to the filler tubes 44 to form cylinder members 260 within the mold cavity members 38. At the same time if the material 250 in the feeder tubes 44 is in excess of a given amount, the feed material apparatus automatically removes a portion of the excess material. Thus, there is no accumulation of excess material 250 within the filler tubes 44 as one cycle of molding operation follows a previous cycle of molding operation.

I claim:
1. Apparatus for transfer of flowable mold material comprising:
- a hopper for containing flowable mold material, the hopper having an opening therein at the bottom portion thereof for movement of flowable material therefrom,
- limited capacity flowable mold material receiver means spaced from the hopper,
- an imperforate first shelf disposed below the opening in the hopper in closely spaced relationship thereto, the imperforate first shelf being larger than the opening in the hopper and substantially closing the opening in the hopper, the imperforate first shelf having a portion adjacent the receiver means,
- an imperforate second shelf, the imperforate second shelf being larger than the first shelf and disposed below all of the first shelf and in spaced relationship with respect thereto, the imperforate second shelf having a portion within the receiver means,
- an endless movable conveyor member, the conveyor member having a plurality of openings therethrough, the conveyor member having an upper portion above the imperforate first shelf and in juxtaposition with respect thereto, the conveyor member having a lower portion above the imperforate second shelf and in juxtaposition with respect thereto,
- means positioning the conveyor member adjacent the receiver means so that a portion of the conveyor member is positioned within the receiver means to effect return of excess mold material toward said hopper,
- the conveyor member having the upper portion thereof moving in a direction away from the mold material receiver means so that material is moved from the hopper by the upper portion of the conveyor member and along the imperforate first shelf, the mold material being moved from the first shelf by the upper portion of the conveyor member and falling through the openings in the upper portion of the conveyor member to the imperforate second shelf, the lower portion of the conveyor member moving toward the mold material receiver means so that the mold material which falls upon the second shelf from the first shelf is moved by the lower portion of the conveyor member upon the second shelf to the flowable mold material receiver means, with continued movement of the conveyor member there being a quantity of mold material moved to the receiver means in excess of that required for filling the receiver means, there thus being assurance of a sufficient quantity of mold material to fill the mold material receiver means,
- the portion of the conveyor member within the mold material receiver means moving upwardly from the second shelf and then along the first shelf and carrying excess mold material in a direction from the mold material receiver means toward the hopper when the mold material receiver means is filled.

* * * * *